US009730388B2

(12) United States Patent
Reichmuth

(10) Patent No.: US 9,730,388 B2
(45) Date of Patent: Aug. 15, 2017

(54) PARALLEL OSCILLATING RAILS OF A SHAKER HARVESTER

(71) Applicant: The Wine Group, Inc., Ripon, CA (US)

(72) Inventor: Edward Carl Reichmuth, Manteca, CA (US)

(73) Assignee: The Wine Group, Inc., Ripon, CA (US)

( * ) Notice: Subject to any disclaimer, the term of this patent is extended or adjusted under 35 U.S.C. 154(b) by 0 days.

(21) Appl. No.: 14/983,946

(22) Filed: Dec. 30, 2015

(65) Prior Publication Data

US 2016/0106039 A1 Apr. 21, 2016

Related U.S. Application Data

(63) Continuation of application No. 14/834,674, filed on Aug. 25, 2015, now Pat. No. 9,549,502.

(60) Provisional application No. 62/042,241, filed on Aug. 26, 2014.

(51) Int. Cl.
*A01D 46/00* (2006.01)
*A01D 46/26* (2006.01)
*A01D 46/28* (2006.01)
*A01D 91/04* (2006.01)

(52) U.S. Cl.
CPC ........... *A01D 46/264* (2013.01); *A01D 46/26* (2013.01); *A01D 46/28* (2013.01); *A01D 91/04* (2013.01)

(58) Field of Classification Search
CPC ....... A01D 46/28; A01D 46/26; A01G 17/026
USPC ...................................... 56/340.1
See application file for complete search history.

(56) References Cited

U.S. PATENT DOCUMENTS

| 3,685,266 | A | * | 8/1972 | Mohn | ............... A01D 46/28 56/330 |
| 4,022,001 | A | | 5/1977 | Burton | |
| 4,112,657 | A | | 9/1978 | Benac et al. | |
| 4,198,801 | A | | 4/1980 | Claxton | |
| 4,250,700 | A | | 2/1981 | Horn et al. | |
| 4,286,426 | A | | 9/1981 | Orlando et al. | |
| 4,336,682 | A | | 6/1982 | Orlando | |
| 4,432,190 | A | | 2/1984 | Orlando | |

(Continued)

FOREIGN PATENT DOCUMENTS

DE 60125051 T2 3/2007
EP 0200631 A1 11/1986

(Continued)

OTHER PUBLICATIONS

Applicant-Initiated Interview Summary mailed Oct. 21, 2016, from U.S. Appl. No. 14/834,674, filed Aug. 25, 2015, 5 pages.

(Continued)

*Primary Examiner* — Árpád Fábián-Kovács
(74) *Attorney, Agent, or Firm* — Ascenda Law Group, PC

(57) ABSTRACT

Rail assembly 302 may comprise rail 322 mechanically coupled to oscillating members 305 and 307. In operation, oscillating members 305 and 307 may reciprocate about vertical axes 352 and 353 of vertical shafts 309 and 311, respectively. Reciprocation of the oscillating members may cause rail 322 to travel in arcuate paths 802 and 804. Arcuate paths 802 and 804 may be located in a two-dimensional plane that is perpendicular to vertical shafts 309 and 311. Rail 322 may impart a force on the trunk of a vine so as to dislodge the fruit from the vine.

10 Claims, 12 Drawing Sheets

(56) References Cited

U.S. PATENT DOCUMENTS

| | | | |
|---|---|---|---|
| 4,769,979 A * | 9/1988 | Merant | A01D 46/28 56/328.1 |
| 4,771,594 A * | 9/1988 | Deux | A01D 46/28 56/328.1 |
| 4,793,128 A | 12/1988 | Creed | |
| 4,924,666 A * | 5/1990 | Poncet | A01D 46/28 56/330 |
| 4,982,558 A | 1/1991 | Korthuis | |
| 5,495,708 A | 3/1996 | Scott et al. | |
| 5,642,610 A | 7/1997 | Dupon et al. | |
| 5,765,350 A | 6/1998 | Ochse | |
| 5,921,074 A | 7/1999 | Scott et al. | |
| 6,003,294 A * | 12/1999 | Fitzgerald | A01D 46/28 56/330 |
| 6,076,343 A | 6/2000 | Burke | |
| 6,145,291 A | 11/2000 | Jarmain | |
| 6,155,036 A * | 12/2000 | Pellenc | A01D 46/28 56/328.1 |
| 6,374,538 B1 | 4/2002 | Morris et al. | |
| 6,502,380 B1 * | 1/2003 | Merant | A01D 46/28 56/330 |
| 6,832,469 B2 | 12/2004 | Scott et al. | |
| 6,854,254 B2 | 2/2005 | Merant | |
| 6,901,731 B2 | 6/2005 | Scott et al. | |
| 7,500,342 B2 | 3/2009 | Merant et al. | |
| 7,543,436 B2 | 6/2009 | Scott et al. | |
| 7,640,091 B2 | 12/2009 | Berg et al. | |
| 7,748,206 B1 | 7/2010 | Posselius et al. | |
| 7,841,160 B2 * | 11/2010 | Pellenc | A01D 46/28 56/328.1 |
| 8,511,051 B2 | 8/2013 | Pellenc et al. | |
| 9,060,465 B2 * | 6/2015 | Vande Voort | A01D 75/00 |
| 9,247,768 B2 | 2/2016 | Pellenc et al. | |
| 2004/0079064 A1 * | 4/2004 | Morris | A01G 17/026 56/331 |
| 2010/0024373 A1 | 2/2010 | Pellenc et al. | |
| 2010/0139234 A1 | 6/2010 | Pellenc et al. | |
| 2014/0075914 A1 | 3/2014 | Vande Voort et al. | |

FOREIGN PATENT DOCUMENTS

| | | |
|---|---|---|
| EP | 2149291 B1 | 6/2011 |
| FR | 2417247 A1 | 9/1979 |
| WO | 02/01936 A1 | 1/2002 |

OTHER PUBLICATIONS

Office Action mailed Apr. 27, 2016, from U.S. Appl. No. 14/834,674, filed Aug. 25, 2015, 13 pages.

International Preliminary Report on Patentability mailed Mar. 9, 2017, from the International Bureau of WIPO, for International Patent Application No. PCT/US2015/046660 (filed Aug. 25, 2015), 8 pages.

Amendment and Response to Non-Final Office Action filed Jul. 6, 2016, for U.S. Appl. No. 14/834,674, filed Aug. 25, 2015, 9 pgs.

Final Office Action dated Jul. 26, 2016, for U.S. Appl. No. 14/834,674, filed Aug. 25, 2015, 18 pgs.

Amendment after Final Action filed Sep. 13, 2016, for U.S. Appl. No. 14/834,674 (Aug. 25, 2015), 6 pages.

Striegler; et al., "Introduction to Mechanical Harvesting of Wine Grapes", eXtension (Oct. 22, 2012), downloaded from: https://www.extension.org/pages/60328/introduction-to-mechanical-harvesting-of-wine-grapes#.Vdt3zab9230, 3 pgs.

International Search Report and Written Opinion, from the European Patent Office mailed Nov. 23, 2015, for International Patent Application No. PCT/US2015/046660 (filed Aug. 25, 2015), 12 pgs.

* cited by examiner

PARALLEL OSCILLATING RAILS OF A SHAKER HARVESTER

RELATED APPLICATIONS

This application is a Continuation of U.S. application Ser. No. 14/834,674, filed on 25 Aug. 2015, now issued as U.S. Pat. No. 9,549,502, which is a nonprovisional of and claims priority to U.S. Provisional Application No. 62/042,241, filed on 26 Aug. 2014, both of which are incorporated by reference herein.

FIELD OF THE INVENTION

The present invention is directed to systems and methods for the conversion of a bow rod harvester to provide the functionality of a trunk shaker harvester.

BACKGROUND

There are generally two types of grape harvesters, as characterized by its picking head (e.g., apparatus which is anchored to the frame of the harvester and used to dislodge fruit from fruit-bearing plant, vine and/or tree): (1) a bow rod shaker harvester and (2) a trunk shaker harvester. A bow rod harvester typically includes a head assembly with a set of flexible bow rods (or beaters) that are situated on both sides of a vine (or tree) row. In operation, the bow rods strike the canopy at high speed or shake the canopy in order to dislodge the fruit. As such, bow rod harvesters may also be referred to as canopy or foliage shakers. Bow rod harvesters are typically used when the vines are young with trunks that could be severed or severely damaged with the use of a trunk shaker harvester. See, e.g., U.S. Pat. No. 6,145,291 to Jarmain.

A trunk shaker harvester typically includes a head assembly with two parallel rails (or bars) that are situated on each side of a vine (or tree) row. The rails are perpendicular or nearly perpendicular to the vine trunk. In operation, the trunk shaker head is moved side to side (e.g., oscillating like a pendulum about an axis parallel to the direction of travel of the harvester), allowing the rails to shake the vine trunk. For example, the trunk shaker head moves the vine with grape berries to the right, in a direction perpendicular to the vine row, and while the grape berries are moving to the right, the head reverses direction, causing the berries to dislodge from the vine. See, e.g., U.S. Pat. No. 4,286,426 to Orlando et al.

SUMMARY OF THE INVENTION

In accordance with one embodiment, a bow rod harvester is converted into a trunk shaker harvester. Bow rods may be detached from first and second oscillating members of a bow rod harvester, wherein the first oscillating member is configured to reciprocate about a first vertical axis of a first vertical shaft and the second oscillating member is configured to reciprocate about a second vertical axis of a second vertical shaft. A shaker rail, having at least one substantially linear portion adapted to impart a force on a trunk, may be mechanically coupled to the first and second oscillating members.

In accordance with one embodiment, the drive mechanism of the bow rod harvester may be reconfigured in the process of converting the bow rod harvester into the trunk shaker harvester. In the bow rod harvester, the first vertical shaft may be mechanically coupled to the second vertical shaft via a first drive element such that reciprocation of the first vertical shaft about the first vertical axis causes the second vertical shaft to reciprocate about the second vertical axis. In the conversion process, the first drive element may be replaced with a second drive element so as to increase the torque imparted on the second vertical shaft.

In accordance with one embodiment, a harvester comprises a first vertical shaft configured to reciprocate about a first vertical axis, and a second vertical shaft configured to reciprocate about a second vertical axis. A shaker rail, having at least one substantially linear portion adapted to impart a force on a trunk, may be mechanically coupled to the first and second vertical shafts. Reciprocation of the first and second vertical shafts about their respective vertical axes may cause the shaker rail to move from a first position to a second position and from the second position back to the first position. The shaker rail may move in an arcuate path which is located in a two-dimension plane that is perpendicular to the first and second vertical shafts.

These and other embodiments of the invention are described in detail below.

DETAILED DESCRIPTION OF THE INVENTION

Figure 1:
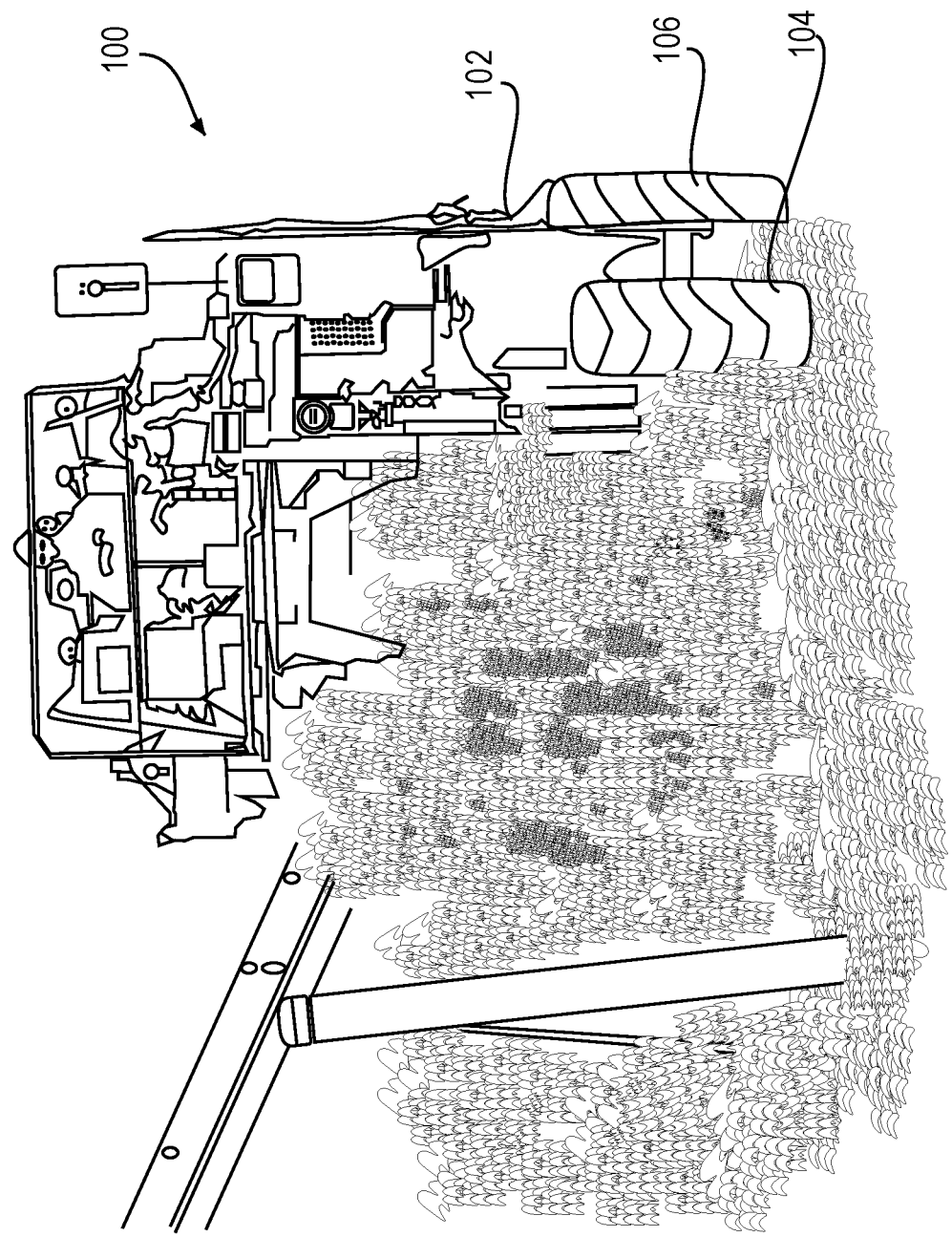
FIG. 1 depicts a front view of a harvester, in accordance with one embodiment.

FIG. 1 depicts a front view of a harvester, in accordance with one embodiment. Harvester 100 includes straddling frame 102 supported by wheels (such as 104 and 106). Harvester 100 also includes an engine (not depicted) that provides motive power to the wheels and harvester head. For simplicity, the description will make reference to harvesting grapes, but those of ordinary skill in the art will recognize that a variety of crops (e.g., almonds, pistachios, coffee, citrus, etc.) can be harvested in accordance with techniques and aspects of the present invention. Straddling frame 102 carries or supports a harvesting apparatus (e.g., harvesting head) configured to detach grapes from vines.

Figure 2:
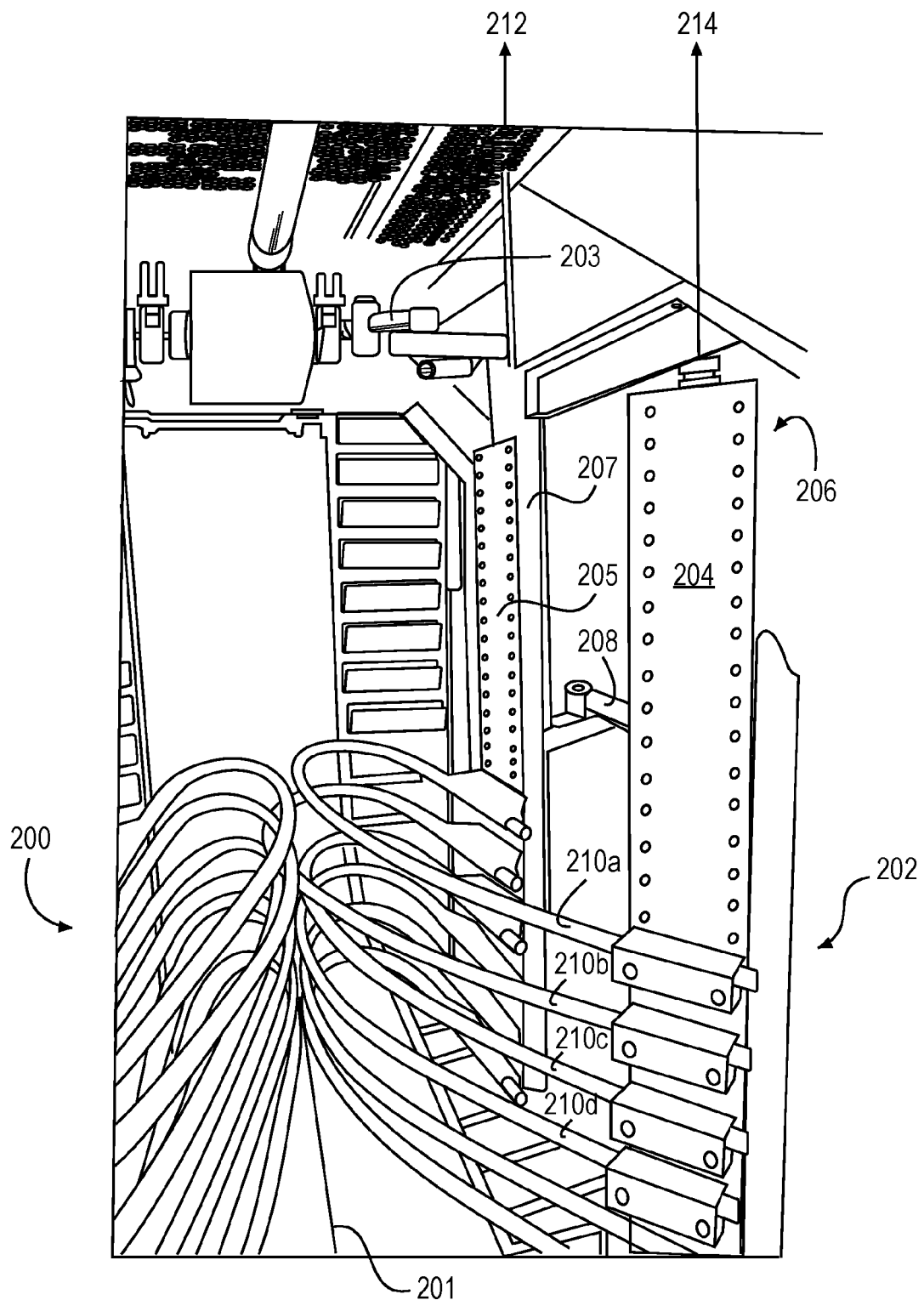
FIG. 2 depicts a front interior view of a bow rod harvester.

FIG. 2 depicts a front interior view of a bow rod head of a bow rod harvester. The front interior view is viewed from the front of the harvester (e.g., front of the harvester depicted in FIG. 1). The bow rod head includes two identical (or nearly identical) bow rod assemblies 200 and 202 (with only a portion of bow rod assembly 200 shown). The bow rod assemblies 200 and 202 are disposed on opposite sides of the interior of the harvester. Bow rod assembly 200 is intended to be positioned on a first side of a vine row, while bow rod assembly 202 is intended to be positioned on a second side of the vine row. With some bending or flexing of bow rods (e.g., 210a-d, collectively 210), vines (not depicted) are allowed to pass between the bow rod assemblies. The path through the bow rod assemblies is denoted by centerline 201.

Primary drive connecting rod 203 is mechanically coupled to vertical shaft 207; vertical shaft 207 is mechanically coupled to oscillating member 205; and oscillating member 205 is mechanically coupled to bow rods 210. Secondary drive connecting rod 208 is mechanically coupled to vertical shaft 207 and vertical shaft 206 (hidden behind oscillating member 204). Vertical shaft 206 is mechanically coupled to oscillating member 204; and oscillating member 204 is also mechanically coupled to bow rods 210. As shown, bow rods 210 are connected to oscillating members 204 and 205 at vertically distributed positions thereof.

In operation, primary drive connecting rod 203 is driven by a linkage that is coupled through a knuckle to a rotation element. Primary drive connecting rod 203 reciprocates vertical shaft 207 about vertical axis 212, which in turn reciprocates oscillating member 205 about vertical axis 212. Reciprocation of vertical shaft 207 about vertical axis 212 causes secondary drive connecting rod 208 to reciprocate vertical shaft 206 about vertical axis 214. Reciprocation of vertical shaft 206 in turn reciprocates oscillating member 204 about vertical axis 214. Reciprocation of oscillating members 204 and 205 cause bow rods 210 to shake.

Although not depicted in FIG. 2, those of ordinary skill in the art will recognize that bow rod assembly 200 may contain the same elements as bow rod assembly 202 (e.g., two oscillating members, two vertical shafts, a primary drive connecting rod, a secondary drive connecting rod, etc.).

Figure 3:
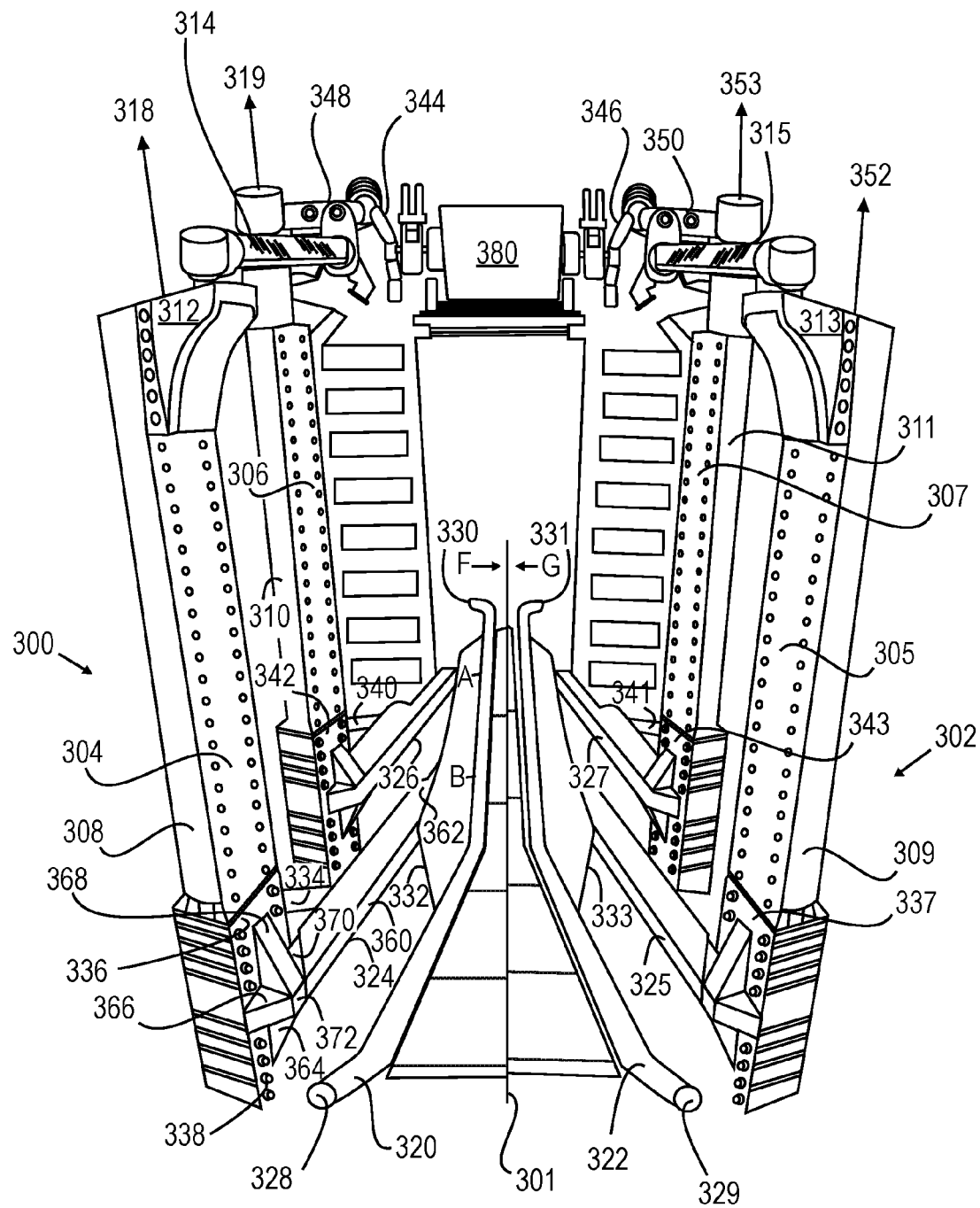
FIG. 3 depicts a front interior view of a trunk shaker harvester, in accordance with one embodiment.

FIG. 3 is an interior view of a harvester originally intended to be fitted with a bow rod head and now having been converted into a trunk shaker harvester, in accordance with one embodiment. The interior view is viewed from the front of the harvester in FIG. 1 and looking to the back of the harvester in FIG. 1. FIG. 3 depicts the bow rod harvester shown in FIG. 2 after removal of the bow rod assemblies and introduction of rail assemblies 300 and 302 (e.g., by bolting the rail assemblies to oscillating members 304, 305, 306 and 307). By using bolts to connect the rail assemblies to the oscillating members, conversion of the harvester from a bow rod head shaker can be completed quickly, e.g., within 90 min or so.

It is noted that oscillating member 305 of FIG. 3 may correspond to oscillating member 204 of FIG. 2, and oscillating member 307 of FIG. 3 may correspond to oscillating member 205 of FIG. 2. Vertical shaft 309 may correspond to vertical shaft 206, and vertical shaft 311 may correspond to vertical shaft 207. Further, primary drive connecting rod 346 may correspond to primary drive connecting rod 203.

In one embodiment, rail assemblies 300 and 302 may be identical, as shown in FIG. 3. In another embodiment, rail assemblies 300 and 302 may differ from one another, for example, with respect to the position of the drive connecting rods, rail size, rail weight, rail dimensions, and/or another feature.

In one embodiment, rail assemblies 300 and 302 may be disposed on opposite sides of the interior of the harvester. Rail assembly 300 is intended to be positioned on a first side of a vine row, while rail assembly 302 is intended to be positioned on a second side of the vine row. Vines (not depicted) are allowed to pass between the rail assemblies. The path through the rail assemblies is denoted by centerline 301.

In one embodiment, rail assembly 300 includes oscillating members 304 and 306. Oscillating member 304 may be attached to vertical shaft 308 and oscillating member 306 may be attached to vertical shaft 310. In a similar manner, rail assembly 302 includes oscillating members 305 and 307. Oscillating member 305 may be attached to vertical shaft 309 and oscillating member 307 may be attached to vertical shaft 311. The vertical shafts 308, 309, 310 and 311 each oscillate, rotate, and/or pivot about their respective longitudinal, vertical axes (e.g., 318, 352, 319 and 353, respectively).

In one embodiment, drive support 312 is attached to oscillating member 304 to support the first drive element(s) of rail assembly 300, such as secondary drive connecting rod 314. The drive 380 (described in more detail in FIG. 6) powers a first set of drive elements for rail assembly 300 and a second set of drive elements for rail assembly 302. Rail assembly 300 may have a primary drive connecting rod 344 as a link from the crankshaft (not shown) to a drive connecting rod connector 348 of vertical shaft 310 to which rail 320 is attached. Although embodiments are described with the use of rails, those of ordinary skill in the art will recognize that ski rods, rods, tubing, square tubing, and/or any cylindrical-shaped object can be utilized within rail assemblies 300 and 302.

The secondary drive connecting rod 314 of rail assembly 300 is connected to drive connecting rod connector 348 and drive support 312. Drive 380 causes the primary drive connecting rod 344 and the secondary drive connecting rod 314 to move, and in turn, the primary and secondary drive connecting rods cause the vertical shafts (e.g., 308 and 310) to pivot and/or oscillate about their respective vertical axes (e.g., vertical axis 318 for vertical shaft 308 and vertical axis 319 for vertical shaft 310). Drive 380 with the use of the primary and secondary drive connecting rods further causes the rail 320 to move toward centerline 301 in a direction as denoted by F to dislodge the fruit, and subsequently retract in the direction opposite to F.

More specifically, rail 320 may impart a force on a trunk of a fruit bearing plant (i.e., fruit bearing plant including a tree, vine, bush, shrub, herb, etc.) so as to dislodge the fruit from the fruit bearing plant. It is understood that some plants, such as a bush or a vine (e.g., raspberry vine), may not have a single well-defined vertical woody growth, but rather a collection of branches and/or vines (with or without woody growth) that grow vertically or at an angle from the ground and/or soil. The term "trunk" is meant to encompass a trunk in the conventional fashion (with a single well-defined vertical woody growth) as well as a collection of branches and/or vines. More generally, rail 320 may impart a force on a post (e.g., base of a trellis, stake, etc.) that supports the fruit bearing plant, the force on the post being subsequently transmitted to the fruit bearing plant at location(s) that the fruit bearing plant is mechanically coupled to the post. Therefore, fruit may even be dislodged without rail 320 directly engaging any portion of the fruit bearing plant.

Drive support 313 is similarly provided for the second drive element(s), such as secondary drive connecting rod 315 of rail assembly 302. Rail assembly 302 has primary drive connecting rod 346 as a link from the crankshaft (not shown) to a drive connecting rod connector 350 of vertical shaft 311 to which rail 322 is attached. Secondary drive connecting rod 315 of rail assembly 302 may be connected to drive connecting rod connector 350 and drive support 313. The drive causes primary drive connecting rod 346 and secondary drive connecting rod 315 to move, and in turn, the primary and secondary drive connecting rods cause the vertical shafts (i.e., 309 and 311) to pivot and/or oscillate about their respective longitudinal, vertical axes (e.g., vertical axis 352 for vertical shaft 309 and vertical axis 353 for vertical shaft 311). The drive causes rail 322 to move toward the centerline 301 in a direction as denoted by G to dislodge the fruit, and subsequently to retract in a direction opposite to G. The first and second drive elements can cause the rails 320 and 322 to strike the grape vine trunks in unison, one rail after the other rail, in timed phase relations, and/or in another time sequence as desired. In other embodiments, multiple drives can be used to drive the primary and secondary connecting rods of each rail assembly.

The location of the secondary drive connecting rod (e.g., 314 and 315) as supported by the corresponding drive support (e.g., 312 and 313) may be selected from any number of positions on the oscillating member (e.g., 304 and 305). In some embodiments, the secondary drive connecting rod of each respective drive is positioned to ensure there is sufficient torque to rotate the vertical shafts (e.g., 308 and 310, and 309 and 311) of the rail assembly (e.g., 300 and 302) with the additional weight of the rail (e.g., 320 and 322) and/or additional supports provided with the conversion (e.g., drive supports, rail supports, and support connectors). The location of the secondary drive connecting rod (e.g., 314 and 315) may be selected (such as near or at the top of the oscillating members 304 and 305 as shown) to allow for the secondary drive connecting rod (e.g., 314 and 315) to handle more weight from the respective rail (e.g., 320 and 322) and additional supports.

By way of further example, the selected location of the secondary drive connecting rod may permit the rail (e.g., 320 and 322) to be supported approximately equidistant from the front and back ends thereof. For example, one or more drive element(s) (e.g., a drive connecting rod 208) as shown in FIG. 2 may be relocated from midway between the vertical shafts of the bow rod head to the top of oscillating member 305 of the converted assembly 302 thereof to ensure that there is sufficient torque to rotate vertical shafts 309 and 311 with rail 322 attached to rail supports 325 and 327 at distances approximately equidistant from the front end 329 and the back end 331. Those of ordinary skill in the art will recognize that there may be a variety of factors that influence the selection of the location of the secondary drive connecting rod of each assembly to ensure there is enough torque including, but not limited to, the position of the rail in relation to the supports, the position of the rail in relation to the vertical shafts, the weight of the rail, the dimensions of the rail, the materials used to make the rails and/or supports, and/or another factors.

In some embodiments, the location of the secondary drive connecting rod(s) may be related to the weight of the rail and/or supports. By way of example, the relocation of secondary drive connecting rod 314 and secondary drive connecting rod 315 from midway between the vertical shafts (e.g., position of 208 in FIG. 2) to at or near the top of the oscillating members may permit rails 320 and 322 to have a weight that is light enough so as to not destroy the converted bow rod harvester when the rails of rail assemblies 300 and 302 are in use (e.g., striking the trunks of the vines), and/or ensure that the rails 320 and 322 of the rail assemblies 300 and 302 have a sufficient weight to avoid fracture during use. In one embodiment, drive connecting rod 208 is re-used as drive connecting rod 315.

The weight, size, dimensions, and materials used for the rails and/or corresponding supports may be selected to ensure that there is sufficient weight to dislodge the fruit, as well as to ensure that the rails do not fracture and/or cause destruction to the harvester (e.g., shake the harvester to the point that components start to break). In some embodiments, the rails are made from metal and have a diameter of at least two inches. By way of example, the rails may be formed from a chromium molybdenum alloy.

Rail supports 324 and 326 may be positioned with respect to rail 320 so as to evenly distribute the weight of rail 320 to rail supports 324 and 326. For example, rail supports 324 and 326 may be connected to the rail 320 at positions approximately equidistant from the front end 328 and back end 330 thereof. In some embodiments, a support connector 332 may be placed between the rail 320 and rail supports 324 and 326. The support connector 332 of rail assembly 300 and support connector 333 of rail assembly 302 may strengthen the respective rails and make the respective rails they support more rigid. The strength and rigidity of the rails may be beneficial to ensure that the rails do not fracture during use.

Support connectors 332 and 333 may allow for attachment of the respective rail supports (e.g., 324, 325, 326 and 327) such that the weight of the rails (e.g., 320 and 322) is more evenly distributed. By way of example, the support connector may be configured to receive the rail supports at points (e.g., points A and B as shown) that divide the rails (individually) into approximately three equal lengths. The support connectors (332 and 333) may provide rigidity and strength to keep the rails lightweight, without risk of fracture during use. The support connector may also allow for redistribution of weight (e.g., approximately even distribution) to ensure that even the use of heavier rails (e.g., heavier than bow rods) does not destroy the harvester. In some embodiments, support connectors 332 and 333 are created from steel square tubing with box weldments affixed to the square tubing that are configured to receive the rail supports (e.g., 324, 326, 325 and 327).

The support connector (e.g., 332 and 333) may provide a way to use rails from existing trunk shakers and adjust the points that rail supports are attached. By way of example, the trunk shaker rails from conventional trunk shakers may not allow for connecting rail supports at points that allow for redistribution of weight and/or approximately evenly distribute the weight to the rail supports. The support connector (e.g., 332 and 333) may be secured to existing rails from traditional trunk shakers and provide a plurality of locations to connect support arms at points that redistribute weight and/or reposition the rails. By way of further example, attachment of existing trunk shaker rails from a conventional trunk shaker would make the distance between point A and 330 much longer than the distance between point B and 328.

Rail supports 324 and 326 (and rail supports 325 and 327) may be viewed as connecting arms. In some embodiments, the rail supports are weldments created from steel plate. In some embodiments, parallelogram shaped plates and/or triangular shaped plates (e.g., steel plate) are welded together to form connecting arms that serve as rail supports. By way of example, parallelogram shaped steel plates are welded together to form tubular shaped weldments 360 and 362. Tubular shape weldments 360 and 362 are welded to four triangular prism shaped weldments (e.g., 364, 366, 368 and 370) that meet at a square shaped steel plate 372, and the four triangular prism shaped weldments (e.g., 364, 366, 368 and 370) are welded to plate 372. Those of ordinary skill in the art will recognize that weldments of various shapes (and various materials) may serve as a rail support.

The rail support (e.g., 324, 326, 325 and 327) may have any number of arms (e.g., 334, 340, 335 and 341) extending out from the respective rail support connected to the straddling frame, oscillating member, vertical shaft, and/or any other part of the harvester. The rail support (e.g., 324, 326, 325 and 327) may be connected to a respective rail support plate (e.g., 336, 342, 337 and 343) and secured to the respective oscillating member (e.g., 304, 306, 305 and 307). The rail support plate (e.g., 336, 342, 337 and 343) may be secured to the oscillating member (e.g., 304, 306, 305 and 307) using any type of securing mechanism including, but not limited to, bolts (e.g., 338), welds, and/or any other mechanism to connect the rail support plate 336 to the oscillating member 304.

Figure 4:
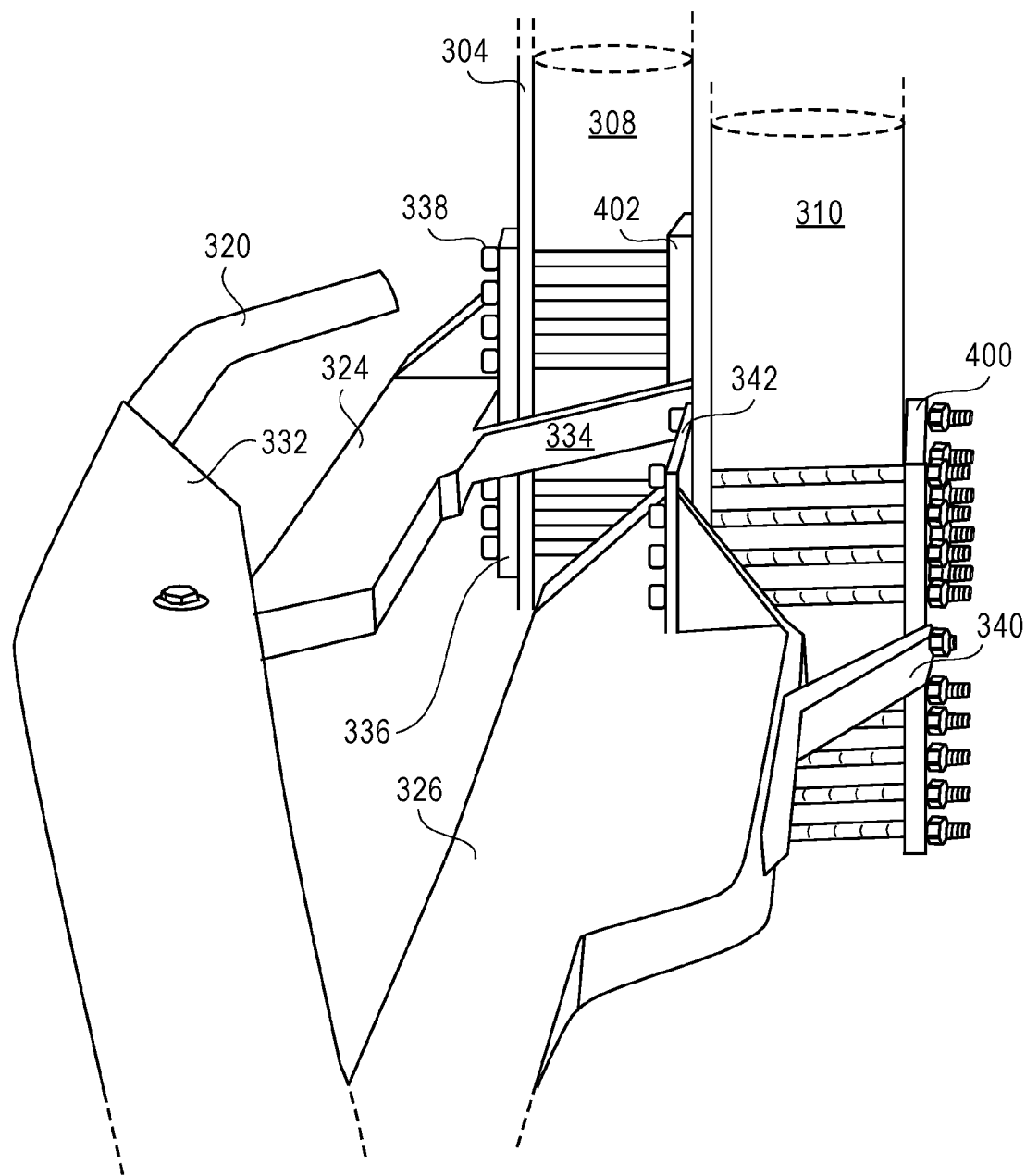
FIG. 4 depicts a back interior view of a portion of a rail assembly of a trunk shaker harvester, in accordance with one embodiment.

FIG. 4 is a back interior view of an exemplary conversion of harvester with a bow rod head into a trunk shaker harvester, in accordance with one embodiment. The back interior view is viewed from the back of the harvester in FIG. 1 and looking to the front of the harvester in FIG. 1. FIG. 4 shows a detailed view of the rail 320, support connector 332, and rail supports 324 and 326 of rail assembly 300. Those with skill in the art will recognize that the back of the supports and rail 322 of rail assembly 302 may have a similar design. Each rail support 324 and 326 may have additional corresponding support arms 334 and 340. The support arms may be secured to the rail support using any securing mechanism including, but not limited to, bolting the support arm to the rail support, welding the support arm to the rail support, and/or another securing mechanism.

The rail supports 324 and 326 may be secured to (e.g., bolted to) rail support plates 336 and 342, respectively, with a securing mechanism. The rail supports 324 and 326 may be fastened to their respective vertical shafts 308 and 310 (e.g., beater posts of a harvester) with vine row-facing rail support plates 336 and 342 and straddling frame-facing rail support plates 402 (support plate 402 being partially obstructed) and 400. In some embodiments, the straddling frame-facing rail support plates are beater arm clamps that are secured to the vertical shaft. Although not depicted in FIG. 4, those with skill in the art will recognize that rail assembly 302 may have a similar construction.

Figure 5:
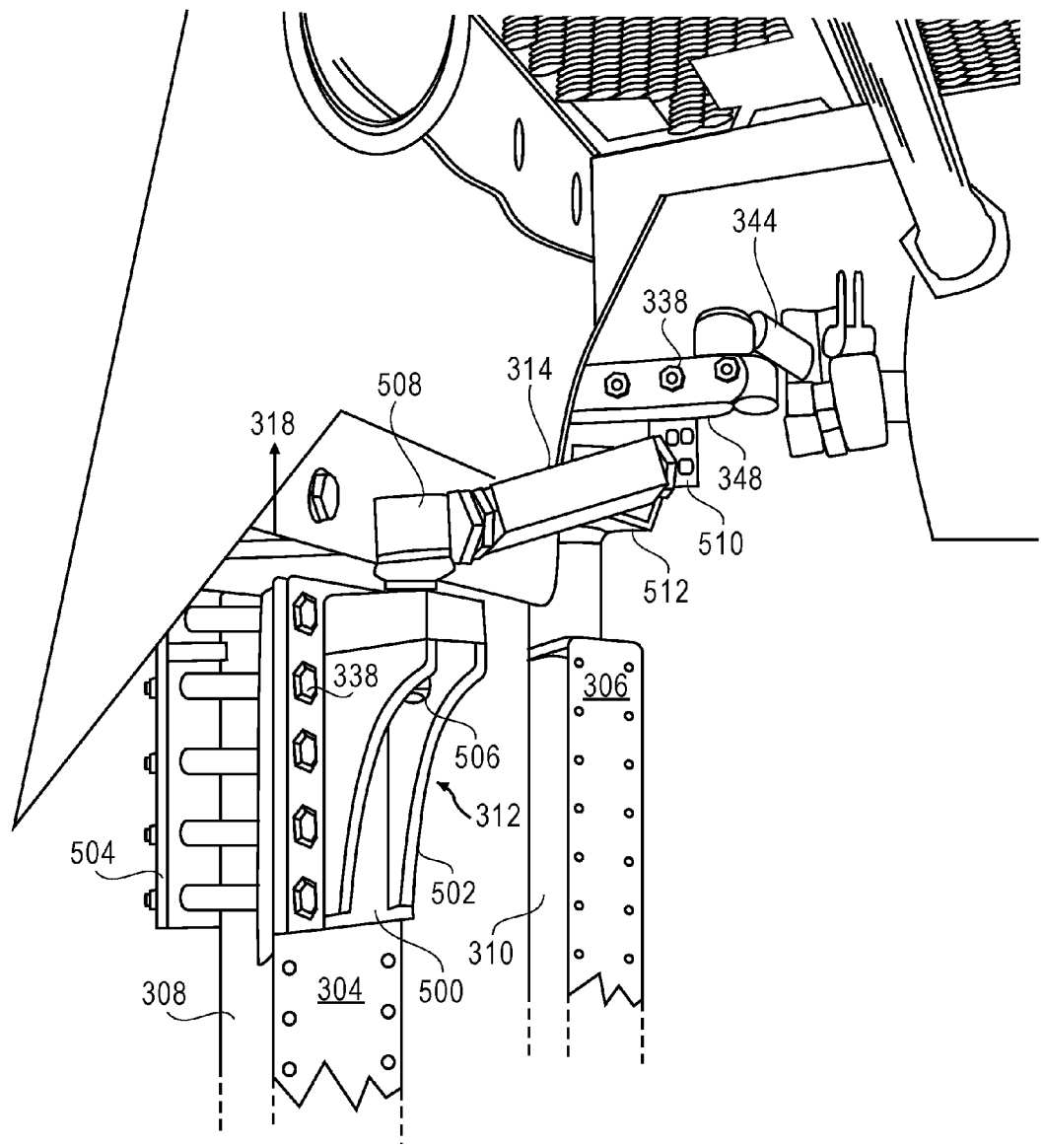
FIG. 5 depicts a front interior view of a portion of a drive mechanism of a trunk shaker harvester, in accordance with one embodiment.

FIG. 5 is a front interior view of a conversion of a harvester with a bow rod head into a trunk shaker harvester, in accordance with one embodiment. The front interior view is viewed from the front of the harvester in FIG. 1 and looking to the back of the harvester in FIG. 1. In particular, FIG. 5 is a close up view of the drive elements of the rail assembly 300. Drive support 312 may be attached to oscillating member 304 to support the secondary drive connecting rod 314. The secondary drive connecting rod 314 may be secured to a secondary connecting rod weldment 502 attached to a vine row facing drive support plate 500 of drive support 312. The secondary connecting rod weldment 502 may be a weldment formed from metal plates (e.g., steel) that is shaped like a shelf configured to receive secondary drive connecting rod 314 and allow secondary drive connecting rod 314 to be secured to secondary connecting rod weldment 502. While shaped like a shelf in some embodiments, secondary connecting rod weldment 502 may be any shape that can receive and allow secondary drive connecting rod 314 to be secured. A secondary connecting rod (e.g., 314 and 315) may be a tie rod with ball joints on ends 508 and 510 thereof. The vine row-facing drive support plate 500 may be secured around vertical shaft 308 by a securing mechanism (e.g., bolts 338) affixed to a companion straddling frame-facing drive support plate 504 (e.g., a weldment clamp).

As mentioned above, secondary connecting rod weldment 502 may have any desired shape to receive secondary drive connecting rod 314, allow secondary drive connecting rod 314 to be secured to the secondary connecting rod weldment 502 (as shown, secured with bolt 506), and allow the secondary drive connecting rod 314 to rotate, pivot, and/or oscillate vertical shaft 308 along longitudinal, vertical axis 318. The secondary drive connecting rods (e.g., 314 and 315) may be modified in size from the size used with the bow rod harvester (e.g., shortened) to reduce the angular displacement of the vertical shafts (e.g., 308 and 309) about their respective axes. Reducing the angular displacement (e.g., from 40° to 30°) may be necessary to counter the increased torsional stress on the vertical shafts caused by replacing the lighter bow rods with the heavier rails. To elaborate, the torsional stress on the vertical shafts peaks when the rails reverse their direction of travel. If the angular displacement were not adjusted, there is an increased chance that the heavier rails could severely damage the vertical shaft at the moment when the rails reverse their direction of movement.

A first end 508 of the secondary drive connecting rod 314 is secured to secondary connecting rod weldment 502 and a second end 510 of the secondary drive connecting rod 314 is configured to be received by drive connecting rod connector 348 and secured into place using a securing mechanism (e.g., bolts). In some embodiments, the second end 510 of secondary drive connecting rod 314 is a plate that may be secured into place on the drive connecting rod connector 348.

Drive connecting rod connector 348 is affixed to vertical shaft 310, and drive connecting rod connector 348 is configured to receive secondary drive connecting rod 314 and primary drive connecting rod 344. Drive connecting rod connector 348 is secured to a vertical shaft shelf 512 (partially obscured by drive connecting rod 314) of vertical shaft 310. Although FIG. 5 describes rail assembly 300, those with skill in the art will recognize that such description is applicable to the elements of rail assembly 302.

Figure 6:
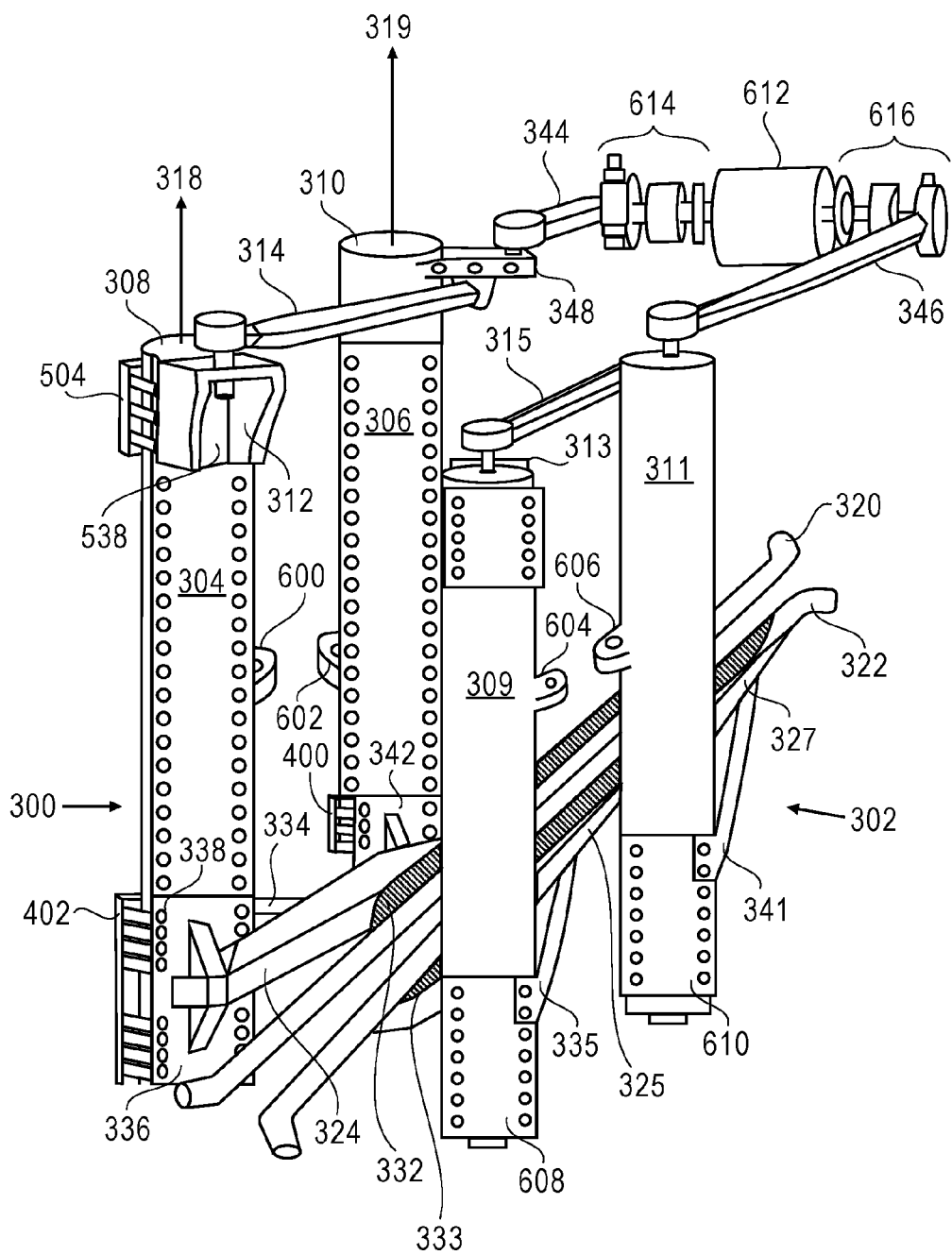
FIG. 6 depicts a perspective view of a trunk shaker harvester, in accordance with one embodiment.

FIG. 6 is a top perspective view of a schematic of a conversion of harvester with a bow rod head into a trunk shaker harvester, in accordance with one embodiment. In FIG. 6, bow rods (e.g., from FIG. 2) have been removed and rails 320 and 322 have been introduced (i.e., disposed on opposite sides to form and define a passage between the rail assemblies). The rail assemblies may utilize the existing vertical shafts (e.g., 308, 310, 309 and 311), oscillating members (e.g., 304, 306, 305 and 307), the drive, and primary drive connecting rods 344 and 346 of the bow rod shaker assemblies depicted in FIG. 2.

The secondary drive connecting rods 314 and 315 may be removed from bow rod drive connecting rod elements (e.g., 600, 602, 604, and 606) on the vertical shafts for the conversion from the bow rod harvester FIG. 2. In some embodiments, the bow rod drive connecting rod elements are brackets. After the secondary drive connecting rods 314 and 315 are removed, the secondary drive connecting rod 314 may be secured to drive support 312 and secondary drive connecting rod 315 may be secured to the drive support 313 (mostly obscured in the illustration). The rail assemblies 300 and 302 may introduce drive supports 312 and 313 to allow for relocation of secondary drive connecting rods 314 and 315 from their location in FIG. 2 (e.g., midway between in connectors 600 and 602, and 604 and 606).

Drive supports 312 and 313 may allow a user (e.g., mechanic) to position secondary drive connecting rods 314 and 315 at any vertical location along the oscillating members. By way of example, the secondary drive connecting rod 314 is secured to the drive support 312 that is positioned at or near the top of the oscillating member 304. Those with skill in the art will recognize that drive support 312 may be positioned at any vertical location along oscillating member 304 in order to relocate secondary drive connecting rod 314.

Drive connector 348 is configured to receive secondary drive connecting rod 314 and secondary drive connecting rod 314 may be secured to drive connector 348. Drive connector 348 may be an existing drive connector as provided with the bow rod harvester in FIG. 2. In other embodiments, the drive connector 348 may be modified to accommodate secondary drive connecting rod 314 using any available method including, but not limited to, moving the primary drive connecting rod 344 to make room for another drive connecting rod, increasing the size of the existing drive connector, and/or adding a new drive connector. In some embodiments, a new drive connector may be added to the vertical shaft 310, the oscillating member 306, and/or another element of the assembly 300. By way of example, a drive connector similar to 602 may be added to an element of the assembly 300 (e.g., vertical shaft 310, oscillating member 306). Although an example is provided for secondary drive connecting rod 314, those with skill in the art will recognize this is provided for ease of description, and the example is equally applicable to secondary drive connecting rod 315 and drive support 313.

Drive support 312 may be secured to vertical shaft 308 and oscillating member 304 using plates 538 and 504. A similar construction is provided for drive support 313. A drive connecting rod-receiving element (e.g., drive support 312 and 313) may be secured to an element of the rail head assembly (e.g., 300 and 302) using another method and/or other elements including, but not limited to, using a single plate with a drive connecting rod receiving element secured to the oscillating member, securing a drive connecting rod receiving element to the vertical shaft and/or oscillating member, and/or another method for securing a drive connecting rod receiving element. The drive connecting rod-receiving element may be any type, shape and created from any material desired. For example, drive connecting rod receiving element may be drive support 312, bow rod drive connecting rod element 600, drive connector 348, and/or any other type or shape desired.

To convert the bow rod assemblies to trunk shaker rail assemblies (e.g., 300 and 302), rails (320 and 322) and accompanying supports (e.g., support plates 336 and 402, support connector 332, arm support 334 and rail support 324) may be secured to the vertical shaft (e.g., 308) and oscillating member (e.g., 304). Although a particular construction for accompanying supports for rails 320 and 322 is described, those with skill in the art will recognize that any construction of a rail support may be used to secure the rail to a vertical shaft and/or oscillating member, and be used with the methods and systems described herein for relocating the secondary drive connecting rod.

For ease of description, the accompanying supports for rail 320 will be described, but those with skill in the art will recognize the methods and systems for rail assembly 300 are applicable to rail assembly 302. Vine-facing support plate 336 is secured using a securing mechanism (e.g., bolts 338) to oscillating member 304 and frame-facing support plate 402. In turn, support plate 336 is also affixed to vertical shaft 308. In some embodiments, a single support plate may be used.

In one embodiment, rail support 324 may be affixed to support plate 336 and may have any number of arm supports (e.g., one as shown with 334, a plurality of arm supports, or no arm supports). Arm support 334 may be secured to the back of support plate 402 (e.g., in the fashion similar to how arm supports 335 and 341 are secured to support plates 608 and 610, respectively). Rail support 324 may be secured to support plate 336 using any securing mechanism (e.g., welds, bolts). In other embodiments, rail support 324 may be secured directly to oscillating member 304 and/or vertical shaft 308. Support connector 332 may be used to connect rail 320 to rail support 324. In other embodiments, a support connector may not be used. The materials used for the elements of rail assemblies 300 and 302 may be metal, plastic, another material, and/or combination thereof.

Similar to rail assembly 300, in rail assembly 302, rail 322 may be supported by support connector 333, rail supports 325 and 327, arm supports 335 and 341, and support plates 608 (e.g., companion to support plate 337, not shown) and 610 (e.g., companion to support plate 343, not shown).

As shown, the drive including pinch drum 612 transfers power from the harvester engine to drive eccentrics 614 and 616, and cause the pivoting, rotating, and/or oscillation of the vertical shafts. In some embodiments, the drive causes the vertical shafts to reciprocate back and forth in unison.

Figure 7:
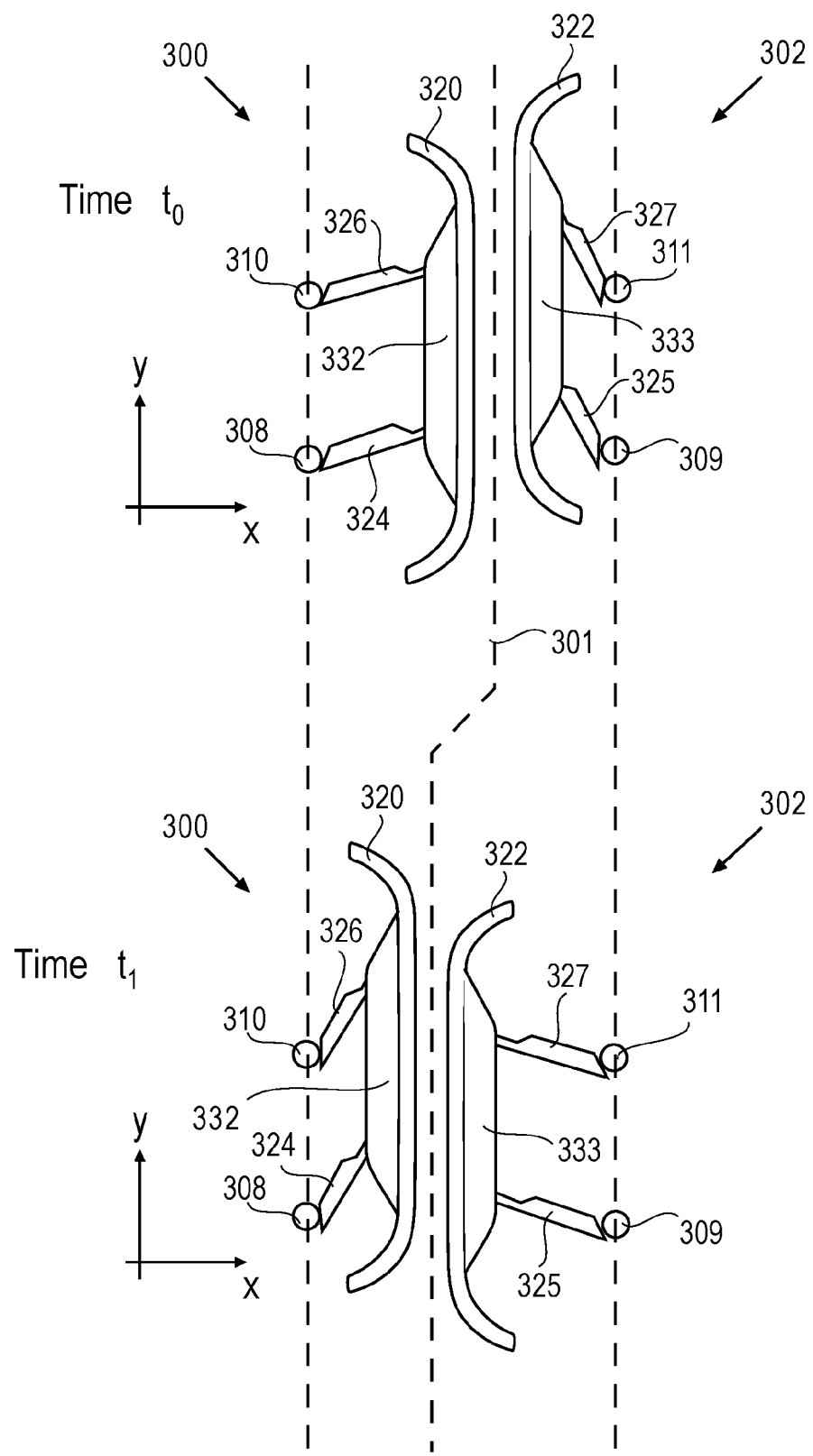
FIG. 7 depicts a top view of rail assemblies of a trunk shaker harvester at two time points, in accordance with one embodiment.

FIG. 7 depicts a top view of rail assemblies 300 and 302 of a trunk shaker harvester at two time points, in accordance with one embodiment. At time $t_0$, rail 320 is in an extended position relative to vertical shafts 308 and 310, while rail 322 is in a retracted position relative to vertical shafts 309 and 311. Similar to the description above, rail 320 may be supported by support connector 332, and support connector 332 may be mechanically coupled to vertical shafts 310 and 308, in part, by rail supports 326 and 324, respectively. For ease of illustration, oscillating members have not been depicted (but if they were depicted, they would be located between a vertical shaft and an adjacent rail support). At time $t_1$ (after vertical shafts 308, 309, 310 and 311 have each rotated counterclockwise by approximately 10°-30° about their respective vertical axes), rail 320 is now in a retracted position relative to vertical shafts 308 and 310, while rail 322 is now in an extended position relative to vertical shafts 309 and 311.

There are several noteworthy observations regarding the time sequence illustration of FIG. 7. First, one will notice centerline 301 with a "right" bias at time $t_0$ and a "left" bias at time $t_1$. One will understand that terms such as "right" and "left" are relative to the position of a person viewing the harvester. If the person were viewing the harvester from the front of the harvester, the centerline could have a "right" bias. If the person were viewing the same harvester (unchanged from the front view) from the back of the harvester, the centerline could have a "left" bias.

Such shifting of the centerline is partially responsible for imparting a shaking motion on a trunk of a crop-bearing plant. For example, if a trunk were located in between rails 320 and 322, rail assemblies 300 and 302 progressing in time (and position) from time $t_0$ to $t_1$ would impart a force in the left direction (i.e., negative x direction) on the trunk. More specifically, the x direction may correspond to a direction perpendicular to the path of the harvester. If rail assemblies 300 and 302 were to travel in time from time $t_1$ to $t_2$ (imagine for the moment that the arrangement of the rail assemblies at time $t_2$ were identical to the arrangement of the rail assemblies at time $t_0$), rail assemblies 300 and 302 would impart a force in the right direction (i.e., positive x direction) on the trunk. In practice, rail assemblies 300 and 302 typically oscillate back and forth between the arrangement in the top portion of FIG. 7 and the arrangement in the bottom portion of FIG. 7, causing a trunk positioned along centerline 301 between rails 320 and 322 to be shaken from side-to-side.

Second, one will notice rails 320 and 322 "sliding" in the longitudinal direction (i.e., in y-axis dimension) relative to one another. More specifically, the y-axis dimension may be parallel to the path of the harvester. One will notice, from time $t_0$ to $t_1$, rail 322 shifting by a negative number in the y-axis, while rail 320 shifts by a positive number in the y-axis. Such "sliding" motion does not appear to be present in conventional trunk shakers. Such "sliding" motion may reduce the scarring on the bark (e.g., scarring on bark sometimes called "barking") due to the rails shaking the trunk (as compared to conventional trunk shakers in which the "sliding" motion is not present).

Figure 8:
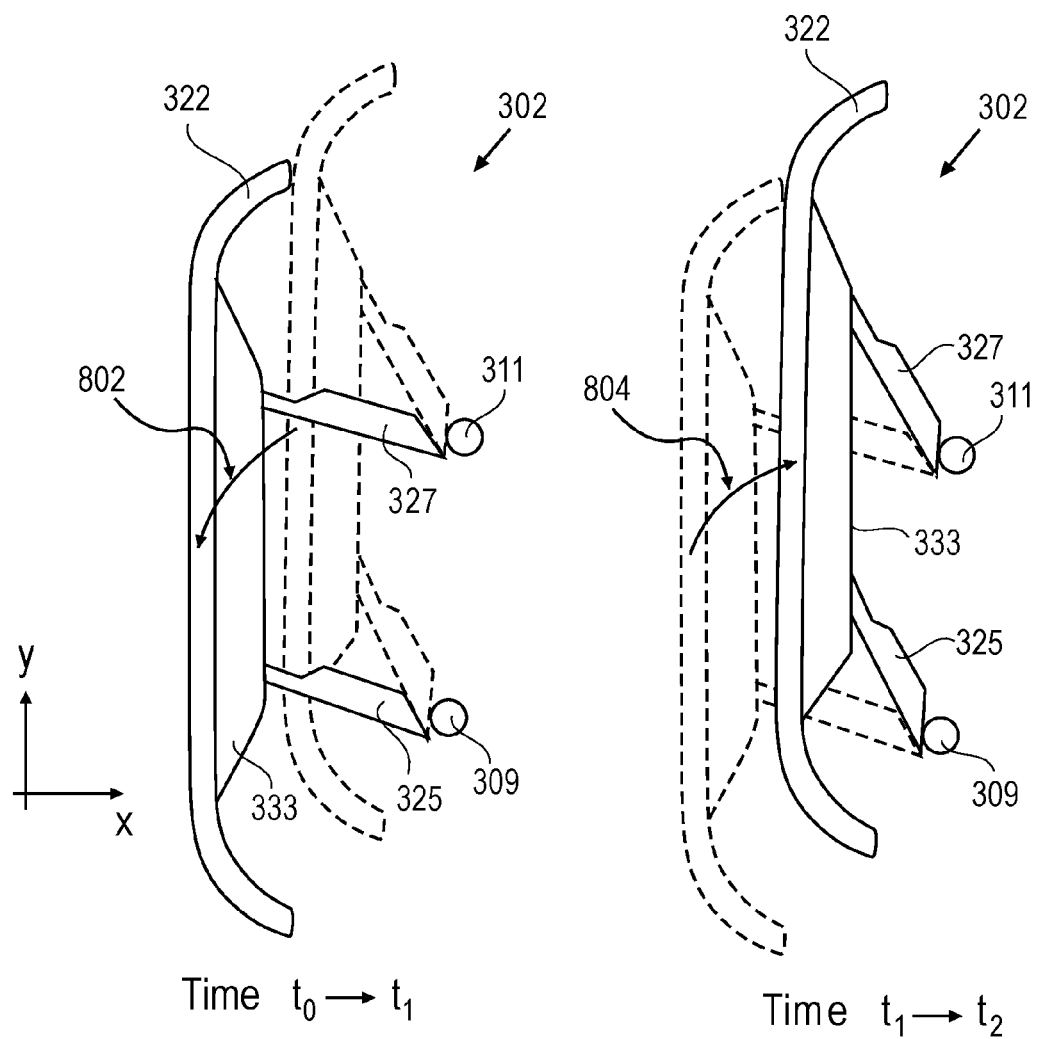
FIG. 8 depicts a time progression of the top view of a rail assembly of a trunk shaker harvester, in accordance with one embodiment.

FIG. 8 depicts a time progression of the top view of rail assembly 302, to better appreciate the path traveled by rail 322. On the left portion of FIG. 8, rail 322 is shown progressing from time $t_0$ to $t_1$. The position of rail 322 at time $t_0$ is shown in dashed line and the position of rail 322 at time $t_1$ is shown in solid line. The midpoint of rail 322 is traced over the time progression, showing path 802 traveled by rail 322 from time $t_0$ to $t_1$. Path 802 may be in the shape of an arc, and may be located in the x-y plane (i.e., a two-dimensional plane that is perpendicular to vertical shafts 311 and 309). On the right portion of FIG. 8, rail 322 is shown progressing from time $t_1$ to $t_2$. The position of rail 322 at time $t_1$ is shown in dashed line and the position of rail 322 at time $t_2$ is shown in solid line. The midpoint of rail 322 is traced over the time progression, showing path 804 traveled by rail 322 from time $t_1$ to $t_2$. Path 804 may be in the shape of an arc, and may be located in the x-y plane (i.e., a two-dimensional plane that is perpendicular to vertical shafts 311 and 309). Path 804 may be the same as path 802, except that path 804 is traversed in the opposite direction.

Figure 9:
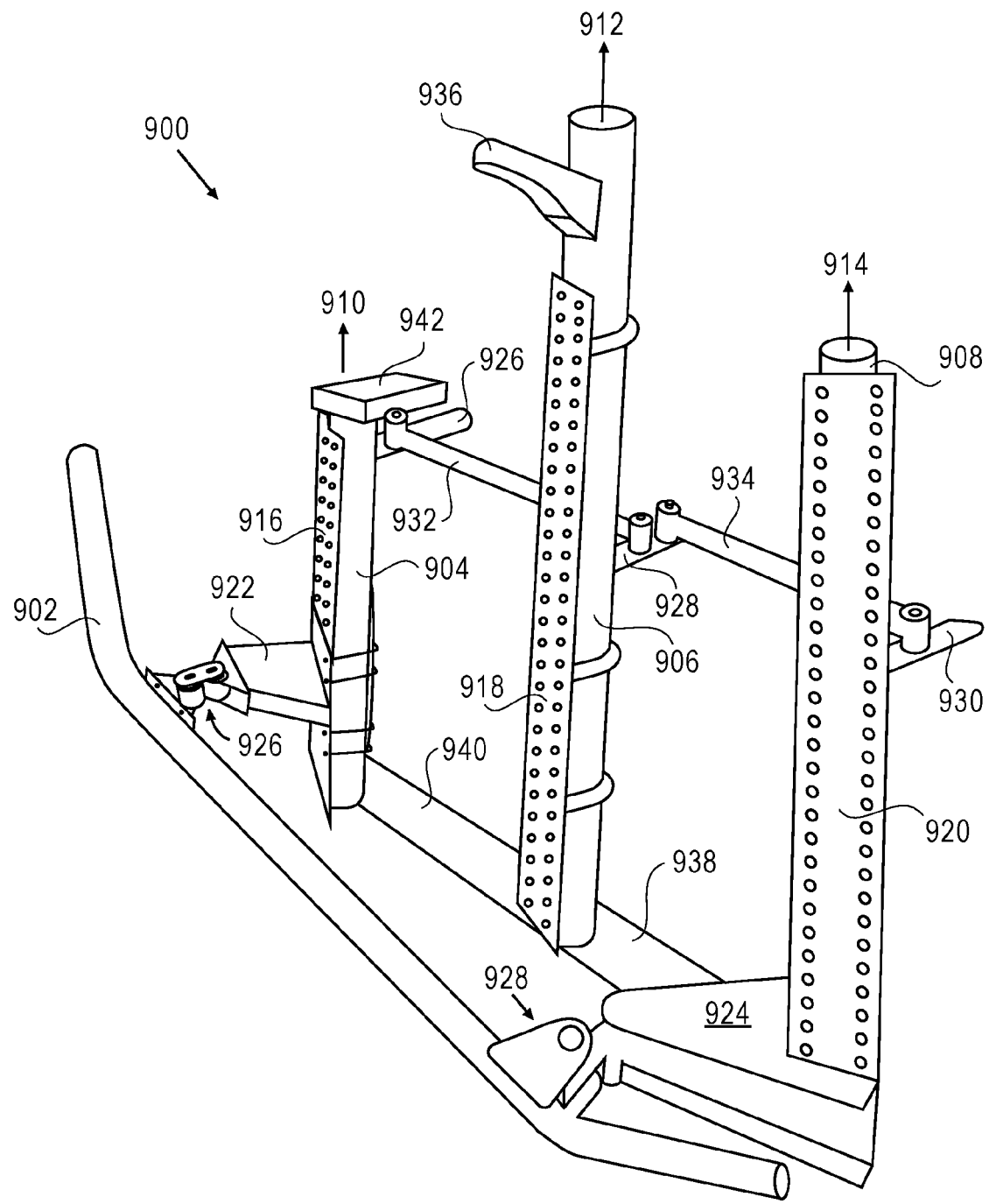
FIG. 9 depicts a perspective view of a rail assembly of a trunk shaker harvester, in accordance with one embodiment.

FIG. 9 depicts a perspective view of rail assembly 900 of a trunk shaker harvester (after a conversion process performed on a rod shaker harvester), in accordance with one embodiment. It is understood that such trunk shaker harvester would include a mirror image of rail assembly 900, but such mirror image has been omitted for clarity of illustration. The basic operation of rail assembly 900 is first described, and following such description, the conversion process is described. In operation, drive support 936 is driven by a drive (not depicted, similar to drive elements 344, 614, 612, 616 and 346 of FIG. 6). Drive support 936 reciprocates vertical shaft 906 about vertical axis 912. Vertical shaft 906 in turn drives bracket member 928 (i.e., pivoting bracket member 928 about vertical axis 912). Affixed to bracket member 928 and bracket member 930 is drive connecting rod 934 which drives vertical shaft 908 (i.e., reciprocating vertical shaft 908 about vertical axis 914). Affixed to bracket member 928 and bracket member 926 is drive connecting rod 932 which drives vertical shaft 904 (i.e., reciprocating vertical shaft 904 about vertical axis 910).

Vertical shaft 904 may be anchored to the frame of the harvester (not depicted) by base anchor member 940 and top anchor member 942. Vertical shaft 906 may be anchored to the frame of the harvester by base anchor members 940 and 938 and/or other anchor members (not depicted). Vertical shaft 908 may be anchored to the frame of the harvester by base anchor member 938 and/or other anchor members (not depicted). Base anchor member 940 and base anchor member 938 may be one integral anchor member, or they may be two separate anchor members.

Oscillating member 916 may be affixed to vertical shaft 904. Oscillating member 918 may be affixed to vertical shaft 906. Oscillating member 920 may be affixed to vertical shaft 908.

Rail support 922 may be affixed to oscillating member 916 and vertical shaft 904 by bolts and plates (similar to the description of FIG. 4). Rail support 924 may be affixed to oscillating member 920 and vertical shaft 908 by bolts and plates (similar to the description of FIG. 4). No rail support may be affixed to oscillating member 918 and vertical shaft 906.

Reciprocation of vertical shaft 904 about vertical axis 910 causes rail support 922 to pivot about vertical axis 910. Reciprocation of vertical shaft 908 about vertical axis 914 causes rail support 924 to pivot about vertical axis 914.

Rail 902 may be mechanically coupled to rail support 922 via dual-pivot fastener 926 (described below in FIG. 10). Rail 902 may be mechanically coupled to rail support 924 via single-pivot fastener 928. Single-pivot fastener 928 may constrain the coupling angle between rail 902 and rail support 922. If a single-pivot fastener were also used to couple rail 902 and rail support 922, such single-pivot fastener would need to be carefully chosen (or tailor made) to match the coupling angle imposed by single-pivot fastener 928. In contrast, dual-pivot fastener 926 allows for a greater range of coupling angles than single-pivot fastener 928. Therefore, dual-pivot fastener 926 allows rail 902 to be coupled to rail support 922 regardless of the coupling angle (between rail 902 and rail support 922) imposed by single-pivot fastener 928.

The synchronized pivoting motions of rail supports 922 and 924 in turn causes rail 902 to reciprocate back and forth, similar to the motion described in FIG. 8. It is noted that a support connector is not utilized in rail assembly 900, but rail assembly 900 could be modified to include a support connector.

The process for converting a bow rod harvester to the trunk shaker harvester shown in FIG. 9 is now described. First, the bow rod assembly may be dismantled, leaving (among other components) vertical shaft 906 (and its oscillating member 918), vertical shaft 908 (and its oscillating member 920), bracket member 930, drive connecting rod 934 and base anchor member 938. Such dismantling process may include removing bow rods (similar to bow rods 210a-d depicted in FIG. 2), and certain drive components (depending on the precise drive mechanism of the bow rod harvester). If bracket member 928 of the bow rod assembly already has two openings (in order to affix two drive connecting rods), bracket member 928 may be left in place. If bracket member 928 of the bow rod assembly were to only have a single opening, bracket member 928 would need to be either replaced or modified to have two openings.

After the dismantling process, components are installed. As part of the installation process, vertical shaft 904 may installed (anchored by base anchor member 940 and top anchor member 942). Oscillating member 916 may be affixed to vertical shaft 904, along with bracket member 926. Drive connecting rod 932 may be affixed to bracket members 926 and 928. Next, rail support 922 may be mounted on oscillating member 916 and vertical shaft 904 using plates and bolts. Similarly, rail support 924 may be mounted on oscillating member 920 and vertical shaft 908 using plates and bolts. Next, rail 902 may be mechanically coupled to rail support 922 using dual-pivot fastener 926 and coupled to rail support 924 using single-pivot fastener 928. Also as part of the installation process, drive support 936 may be secured to vertical shaft 906 and drive elements (not depicted).

Now, having described the operation of rail assembly 900 and the conversion process to arrive at same, the motivation for rail assembly 900 is provided. The main feature provided by rail assembly 900 is an increased spacing between the rail supports, which allows for the use of longer rails (with decreased risk of rail fracture). To elaborate, rail 902 could have been mechanically coupled to vertical shafts 906 and 908, but there would have been a greater separation between at least one of the ends of rail 902 and the rail support, allowing more flexing of the rails in the transverse direction (with increased risk of rail fracture). By increasing the spacing between the rail supports, the degree to which rail 902 flexes in the transverse direction is reduced, thereby reducing the risk of rail fracture.

Figure 10:
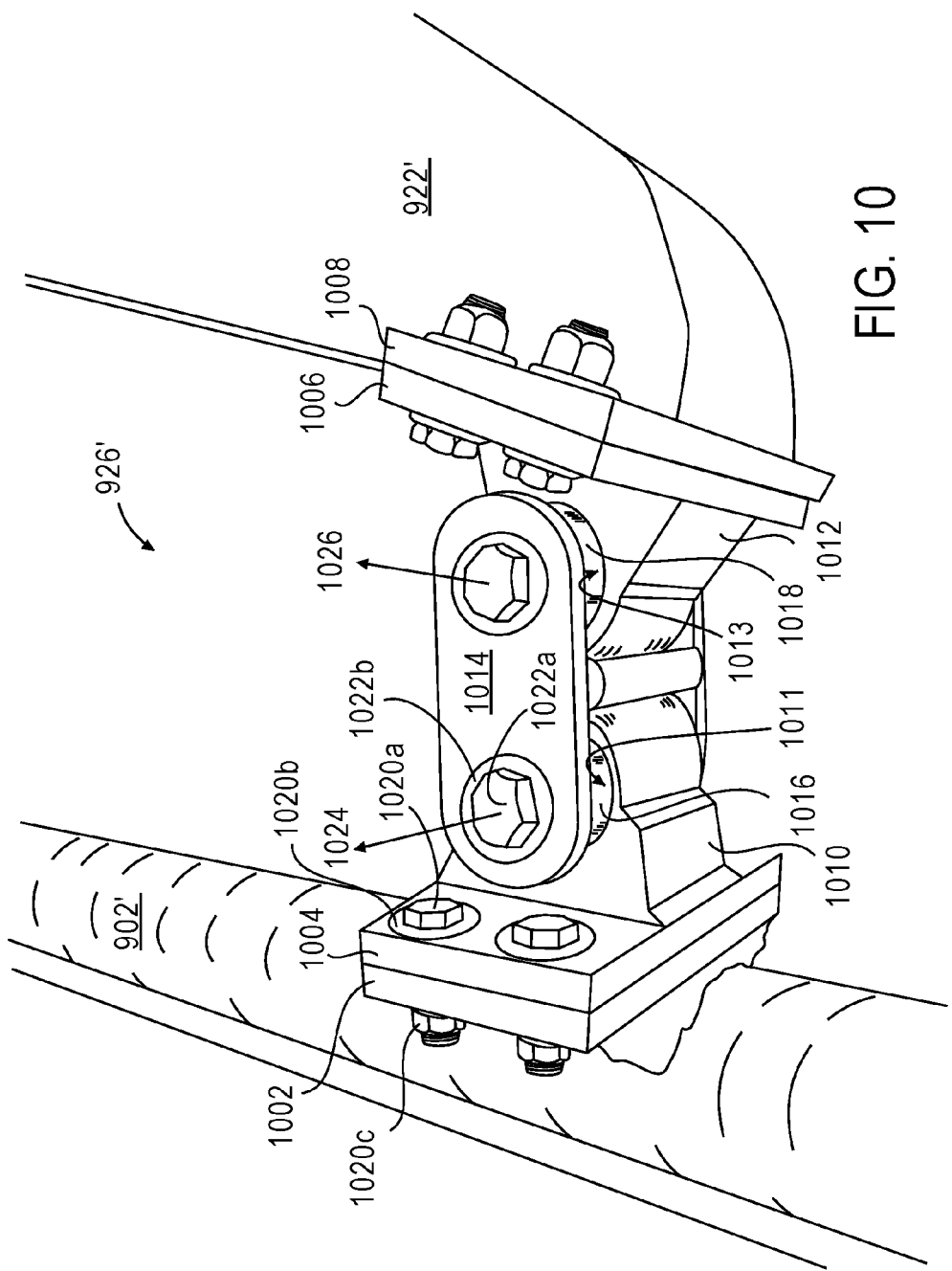
FIG. 10 depicts a perspective view of a dual-pivot fastener (used to fasten a rail to a rail support), in accordance with one embodiment.

FIG. 10 depicts a perspective view of a dual-pivot fastener, in accordance with one embodiment. For ease of illustration, dual-pivot fastener 926' is the mirror image of dual-pivot fastener 926 (i.e., the dual-pivot fastener that would be part of the rail assembly, not depicted, that operates together with rail assembly 900). The main components of dual-pivot fastener 926' are dual-shaft member 1014 and socket members 1010 and 1012. Socket member 1010 contains cylindrical-shaped opening 1011 through which vertical shaft 1016 is inserted. Socket member 1010 is allowed to pivot about vertical axis 1024. Similarly, socket member 1012 contains cylindrical-shaped opening 1013 through which vertical shaft 1018 is inserted. Socket member 1012 is allowed to pivot about vertical axis 1026. Socket member 1010 is mechanically coupled to rail 902' and socket member 1012 is mechanically coupled to rail support 922'.

There are a number of bolts, nuts, washers and plates to mechanically couple the components of FIG. 10, and these coupling mechanism will now be described. Bolt 1022*a* and washer 1022*b* are configured to secure vertical shaft 1016 to dual-shaft member 1014. A similar bolt and washer (not labeled) are configured to secure vertical shaft 1018 to dual-shaft member 1014. Socket member 1010 may be welded to plate 1004; plate 1004 may be bolted to plate 1002 via bolt 1020*a*, washer 1020*b* and nut 1020*c*; and plate 1002 may be welded to rail 902'. Similarly, socket member 1012 may be welded to plate 1006; plate 1006 may be bolted to plate 1008; and plate 1008 may be welded to rail support 922'.

Figure 11:
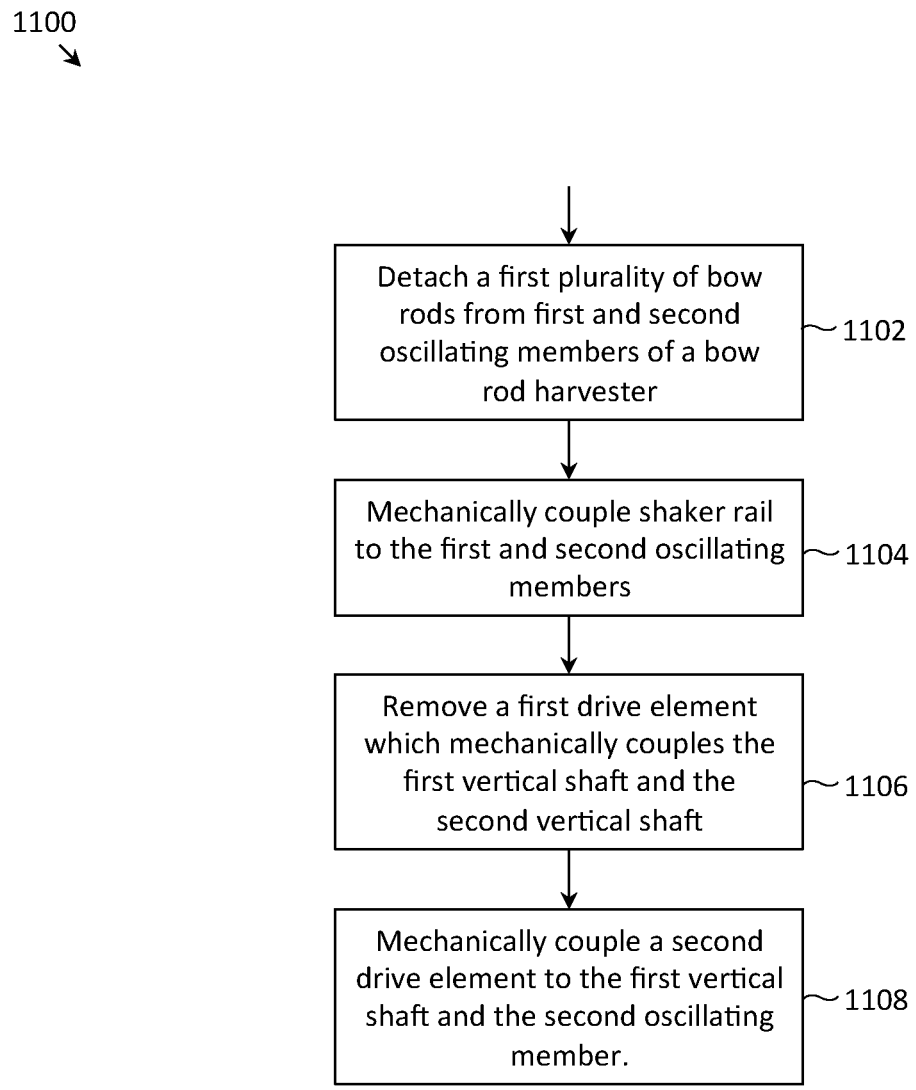
FIG. 11 depicts a flowchart of a process to convert a bow rod harvester into a trunk shaker harvester, in accordance with one embodiment.

FIG. 11 depicts flowchart 1100 of a process to convert a bow rod harvester into a trunk shaker harvester, in accordance with one embodiment. At step 1102, a first plurality of bow rods may be detached from first and second oscillating members of the bow rod harvester. At step 1104, a shaker rail may be mechanically coupled to the first and second oscillating members, the shaker rail having at least one substantially linear portion adapted to impart a force on a trunk. The first oscillating member may be affixed to a first vertical shaft (which reciprocates about a first vertical axis) and the second oscillating member may be affixed to a second vertical shaft (which reciprocates about a second vertical axis). At step 1106, a first drive element which mechanically couples the first vertical shaft to the second vertical shaft may be removed. At step 1108, a second drive element may be mechanically coupled to the first vertical shaft and the second oscillating member. The second drive element may be adapted to reciprocate the second oscillating member about the second vertical axis, wherein a torque imparted by the second drive element on the second oscillating member is greater than a torque imparted by the first drive element on the second vertical shaft. The second drive element may comprise a drive support and a drive connecting rod.

Figure 12:
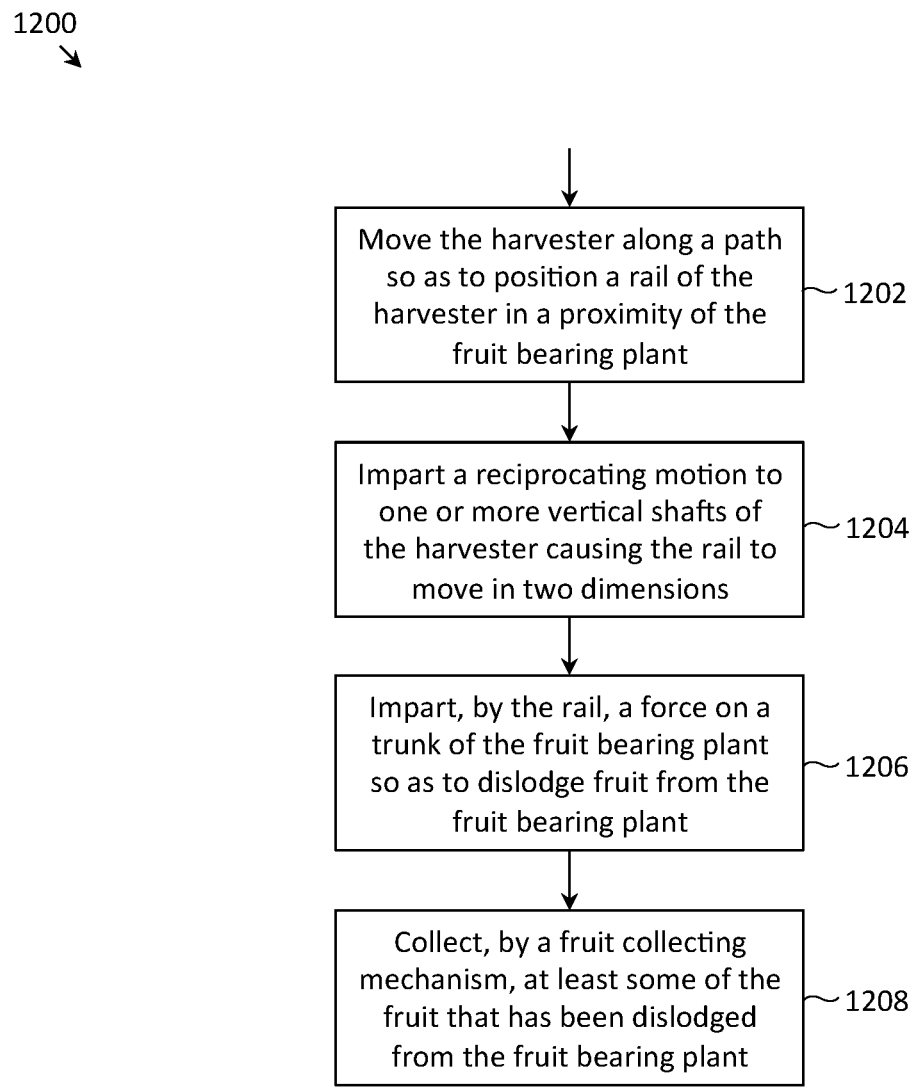
FIG. 12 depicts a flowchart of a process to harvest fruit from a fruit bearing plant using a trunk shaker harvester, in accordance with one embodiment.

FIG. 12 depicts flowchart 1200 of a process to harvest fruit from a fruit bearing plant using a trunk shaker harvester, in accordance with one embodiment. At step 1202, the harvester may be moved (e.g., driven) along a path so as to position a rail of the harvester in the proximity of the fruit bearing plant. The path of the harvester may be a straight path. At step 1204, a reciprocating motion may be imparted (by the drive mechanism described above) to at least one vertical shaft of the harvester causing the rail to move in a path located in a two-dimensional plane. A first dimension of the two-dimensional plane may be parallel to the path of the harvester and a second dimension of the two-dimensional plane may be perpendicular to the path of the harvester. The path of the rail may be an arcuate path, and the two-dimensional plane may be perpendicular to an axis of the least one vertical shaft. At step 1206, the rail may impart a force on a trunk of the fruit bearing plant so as to dislodge fruit from the fruit bearing plant. A first component of the force may be in the first dimension parallel to the path of the harvester and a second component of the force may be in the second dimension perpendicular to the path of the harvester. At step 1208, a fruit collecting mechanism (e.g., plates positioned under the rail assemblies configured to catch and deliver the fruit to a conveyer belt which transports the fruit to a container for storing the fruit) may collect at least some of the fruit that has been dislodged from the fruit bearing plant.

Now, some motivations for converting a bow rod harvester into a trunk shaker harvester are provided. As explained above, a bow rod harvester may be better suited to harvest fruit from young vines which could be damaged or killed by a trunk shaker harvester (e.g., the trunk of young vines could be severed by a trunk shaker harvester). Therefore, a farmer may purchase a bow rod harvester to harvest fruit from young vines. However, as the vines mature, a trunk shaker harvester may be better suited to harvest the fruit, as a trunk shaker harvester can have less damage on the canopy of a vine than a bow rod harvester. Ordinarily, the farmer would need to purchase a trunk shaker harvester at this point if he/she does not already have such a harvester available. Techniques in accordance with the present invention now allow the farmer to convert the bow rod harvester into a trunk shaker harvester. In many cases, the cost associated with the conversion are significantly lower than the cost of a trunk shaker harvester, which provides an economical incentive to perform the conversion instead of purchasing a trunk shaker harvester.

There are other scenarios that may arise that would benefit from the ability to convert bow rod harvesters into trunk shaker harvesters. For instance, bow rod harvesters may be better suited to harvest vines planted with a first trellis type, and trunk shaker harvesters may be better suited to harvest vines planted with a second trellis type. Suppose a farmer originally plants his/her field with the first trellis type and purchases a bow rod harvester for the harvest of the fruit. Later, suppose the farmer re-plants his/her field with the second trellis type. Ordinarily, the farmer would need to purchase a trunk shaker harvester at this point if he/she does not already have such a harvester available. Techniques in accordance with the present invention now allow the farmer to convert the bow rod harvester into a trunk shaker harvester.

In yet another scenario, a change of pruning method could also motivate the conversion of a bow rod harvester into a trunk shaker harvester. By way of background, there are two typical pruning types: cane pruning or cordon (also called spur) pruning. In cane pruning, every winter (or dormant period), vines are pruned backed into a vertical trunk which resembles a "cane". Side branches are pruned to at most a few inches from the vertical trunk. In cordon pruning, every winter (or dormant period), vines are pruned backed into a structure having a vertical trunk and two main horizontal branches which are supported by a trellis. A cordon-pruned vine typically has the shape of a capital "T".

Cordon-pruned vines can be more susceptible to significant long-term damage to the vine from a bow rod (or canopy) striker so a trunk shaker might be a better choice for a cordon-pruned vineyard. Suppose a farmer initially uses cane pruning and uses a bow rod harvester (which is suitable for a cane-pruned vine). Suppose at a later time, the farmer decides to switch from cane pruning to cordon pruning (allowing two horizontal branches to develop and mature). At this point, a trunk shaker harvester would be better suited to harvest the grapes. Ordinarily, the farmer would need to purchase a trunk shaker harvester at this point if he/she does not already have such a harvester available. Techniques in accordance with the present invention now allow the farmer to convert the bow rod harvester into a trunk shaker harvester.

In yet another scenario, a change in the grape variety could also motivate the conversion of a bow rod harvester into a trunk shaker harvester. By way of background, some grape varieties have a skin that is more resilient (and can be suitably harvested with a bow rod harvester) while other grape varieties have a skin that is more easily bruised, scratched and/or punctured (and would be more suitably harvested with a trunk shaker harvester). Suppose a farmer initially plants a first grape variety with a resilient grape skin and uses a bow rod harvester to harvest the grapes. Suppose at a later time, the farmer decides to replant his/her field with a second grape variety with a less resilient grape skin. Ordinarily, once the vines of the second grape variety mature, the farmer would need to purchase a trunk shaker harvester if he/she does not already have such a harvester available in order to avoid damaging the skin of the grapes. Techniques in accordance with the present invention now allow the farmer to convert the bow rod harvester into a trunk shaker harvester.

In yet another scenario, a change in the consumption method (e.g., juice versus fresh fruit) could also motivate the conversion of a bow rod harvester into a trunk shaker harvester. Suppose a farmer initially plants a vineyard with a grape variety suitable for producing juice and/or wine. A bow rod harvester could be used without concern to bruising or damaging the berries as the berries will be crushed for production of juice and/or wine. Suppose at a later time, the farmer replants his/her vineyard with a table grape variety (meant for consumption while the grapes are fresh). Ordinarily, once the vines of the second grape variety mature, the farmer would need to purchase a trunk shaker harvester if he/she does not already have such a harvester available in order to avoid damaging the table grapes. Techniques in accordance with the present invention now allow the farmer to convert the bow rod harvester into a trunk shaker harvester. More generally, switching from a first crop for which integrity of the fruit is not important (e.g., almonds) to a second crop for which integrity of the fruit is important (e.g., table grapes) could also motivate the conversion of a bow rod harvester into a trunk shaker harvester.

While much of the description so far has concentrated on converting a bow rod harvester into a trunk shaker harvester, it is certainly possible to extend the techniques described above to convert a trunk shaker harvester into a bow rod harvester (by performing the conversion process in the opposite order). There are certainly reasons for performing this reverse conversion. For example, a mature vines (better suited for a trunk shaker harvester) might be replanted with a young vines (better suited for a bow rod harvester) as the yield of the mature vines decreases. Likewise, the second trellis type (better suited for a trunk shaker harvester) might be replaced with the first trellis type (better suited for a bow rod harvester).

While much of the description so far has concentrated on converting a bow rod harvester with four oscillating members, it is possible to convert a bow rod harvester with a greater or a fewer number of oscillating members. For example, in a bow rod harvester with six oscillating members (three oscillating members on each side of the harvester), each rail assembly could be mechanically coupled to three oscillating members. For example, in a bow rod harvester with two oscillating members (one oscillating member on each side of the harvester), each rail assembly could be mechanically coupled to one oscillating member (e.g., two rail supports couple a rail to a single oscillating member).

While it may be desirable to convert a bow rod harvester into a trunk shaker harvester (and vice versa), it may also be desirable to add rail assemblies onto a bow rod harvester (in a process similar to that described above, but without removing the bow rods), thereby transforming the bow rod harvester into a dual bow rod and trunk shaking harvester. Similarly, it may also be desirable to add bow rods onto a trunk shaker harvester (without removing the rails), thereby transforming the trunk shaker harvester into a dual trunk shaker and bow rod harvester.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A harvester, comprising:
a first, second, third and fourth oscillating member configured to reciprocate about a first, second, third and fourth vertical axis, respectively;
a substantially rigid first shaker rail having at least one substantially linear portion adapted to impart a force on a trunk, the first shaker rail affixed to first and second rail supports via first and second hinged fasteners, respectively, and the first and second rail supports affixed to the first and second oscillating members via first and second rigid fasteners, respectively, such that reciprocation of the first and second oscillating members about their respective vertical axes cause the first shaker rail to move from a first position to a second position and from the second position back to the first position, wherein the first shaker rail moves, relative to a frame of the harvester, in a first arcuate path located in a two-dimensional plane, a first dimension of the two-dimensional plane being parallel to a path of the harvester and a second dimension of the two-dimensional plane being perpendicular to the path of the harvester; and a substantially rigid second shaker rail having at least one substantially linear portion adapted to impart a force on the trunk, the second shaker rail affixed to third and fourth rail supports via third and fourth hinged fasteners, respectively, and the third and fourth rail supports affixed to the third and fourth oscillating members via third and fourth rigid fasteners, respectively, such that reciprocation of the third and fourth oscillating members about their respective vertical axes cause the second shaker rail to move from a third position to a fourth position and from the fourth position back to the third position, wherein the second shaker rail moves, relative to the frame of the harvester, in a second arcuate path located in the two-dimensional plane, wherein the harvester is configured such that the first and second shaker rails move, relative to the frame of the harvester, in opposite directions along the first dimension parallel to the path of the harvester.

2. The harvester of claim 1, wherein the two-dimensional plane is perpendicular to the first, second, third and fourth vertical axes.

3. The harvester of claim 1, wherein the first, second, third and fourth rail about the first, second, third and fourth vertical axes, respectively.

4. The harvester of claim 1, further comprising first, second, third and fourth vertical shafts, wherein the first, second, third and fourth oscillating members are affixed to the first, second, third and fourth vertical shafts, respectively.

5. The harvester of claim 1, wherein the trunk is one of a grape vine trunk, an almond tree trunk, a citrus tree trunk, a raspberry plant trunk, and a coffee plant trunk.

6. A harvester, comprising:
a first, second, third and fourth oscillating member configured to reciprocate about a first, second, third and fourth vertical axis, respectively;
a substantially rigid first shaker rail having at least one substantially linear portion adapted to impart a force on a trunk, the first shaker rail affixed to a first support connector, the first support connector affixed to first and second rail supports via first and second hinged fasteners, respectively, and the first and second rail supports affixed to the first and second oscillating members via first and second rigid fasteners, respectively, such that reciprocation of the first and second oscillating members about their respective vertical axes cause the first shaker rail to move from a first position to a second position and from the second position back to the first position, wherein the first shaker rail moves, relative to a frame of the harvester, in a first arcuate path located in a two-dimensional plane, a first dimension of the two-dimensional plane being parallel to a path of the harvester and a second dimension of the two-dimensional plane being perpendicular to the path of the harvester; and a substantially rigid second shaker rail having at least one substantially linear portion adapted to impart a force on the trunk, the second shaker rail affixed to a second support connector, the second support connector affixed to third and fourth rail supports via third and fourth hinged fasteners, respectively, and the third and fourth rail supports affixed to the third and fourth oscillating members via third and fourth rigid fasteners, respectively, such that reciprocation of the third and fourth oscillating members about their respective vertical axes cause the second shaker rail to move from a third position to a fourth position and from the fourth position back to the third position, wherein the second shaker rail moves, relative to the frame of the harvester, in a second arcuate path located in the two-dimensional plane, wherein the harvester is configured such that the first and second shaker rails move, relative to the frame of the harvester, in opposite directions along the first dimension parallel to the path of the harvester.

7. The harvester of claim 6, wherein the two-dimensional plane is perpendicular to the first, second, third and fourth vertical axes.

8. The harvester of claim 6, wherein the first, second, third and fourth rail supports pivot about the first, second, third and fourth vertical axes, respectively.

9. The harvester of claim 6, further comprising first, second, third and fourth vertical shafts, wherein the first, second, third and fourth oscillating members are affixed to the first, second, third and fourth vertical shafts, respectively.

10. The harvester of claim 6, wherein the trunk is one of a grape vine trunk, an almond tree trunk, a citrus tree trunk, a raspberry plant trunk, and a coffee plant trunk.

* * * * *